United States Patent
Cunningham et al.

(10) Patent No.: US 9,399,506 B2
(45) Date of Patent: Jul. 26, 2016

(54) SELF TRANSPORTABLE AEROSTAT SYSTEM

(71) Applicant: TCOM, LP, Columbia, MD (US)

(72) Inventors: Edward Cunningham, Clarksville, MD (US); Han Dinh Phan, Alexandria, VA (US)

(73) Assignee: TCOM, LP, Columbia, MD (US)

( * ) Notice: Subject to any disclaimer, the term of this patent is extended or adjusted under 35 U.S.C. 154(b) by 716 days.

(21) Appl. No.: 13/735,728

(22) Filed: Jan. 7, 2013

(65) Prior Publication Data

US 2014/0077030 A1 Mar. 20, 2014

Related U.S. Application Data

(60) Provisional application No. 61/583,958, filed on Jan. 6, 2012.

(51) Int. Cl.
*B64F 1/14* (2006.01)
*B64B 1/66* (2006.01)
*B64B 1/58* (2006.01)
*B64F 1/12* (2006.01)
*B64B 1/50* (2006.01)

(52) U.S. Cl.
CPC ... *B64B 1/66* (2013.01); *B64B 1/50* (2013.01); *B64B 1/58* (2013.01); *B64F 1/12* (2013.01); *B64F 1/14* (2013.01)

(58) Field of Classification Search
CPC ............... B64B 1/50; B64B 1/66; B64F 1/12; B64F 1/14; B64F 1/225
USPC ........ 244/114 R, 115, 116, 98, 24, 30, 31, 33
See application file for complete search history.

(56) References Cited

U.S. PATENT DOCUMENTS

| 1,275,710 A * | 8/1918 | Lewis ..................... B64B 1/40 244/116 |
| 2,954,187 A * | 9/1960 | Winzen ..................... B64B 1/40 244/31 |
| 3,195,839 A * | 7/1965 | Dietsche .................. B64B 1/62 244/31 |
| 3,814,353 A * | 6/1974 | Nelson ..................... B64B 1/62 244/31 |
| 3,979,753 A * | 9/1976 | Underwood ......... H01Q 1/1292 343/706 |
| 4,402,479 A | 9/1983 | Phipps, III et al. |
| 4,421,286 A | 12/1983 | Laky et al. |
| 4,476,576 A | 10/1984 | Wheeler |
| 4,842,219 A * | 6/1989 | Jakubowski ............... B64B 1/50 182/5 |
| 4,842,221 A | 6/1989 | Beach et al. |

(Continued)

FOREIGN PATENT DOCUMENTS

GB 2055334 A * 3/1981 ................ B64F 1/14

*Primary Examiner* — Tien Dinh
*Assistant Examiner* — Michael A Fabula
(74) *Attorney, Agent, or Firm* — McNair Law Firm, P.A.; Douglas W. Kim (57) ABSTRACT

A self transportable aerostat system comprising: a first motorized mooring truck; a mooring tower removably attached to a base assembly of the first mooring truck, generally vertically arranged in relation to the bed of the first mooring truck; a proximal and distal boom deck removably attached to the base assembly; a flying sheave for redirecting a tether carried by the base assembly and attachable to an aerostat; a second motorized mooring truck attachable to the outer edge of the distal boom; and, an aerostat truck having an electrical connection for connecting to the first mooring truck and having an aerostat storage compartment for storing the aerostat is a retracted configuration.

13 Claims, 12 Drawing Sheets

(56) References Cited

U.S. PATENT DOCUMENTS

| | | | | |
|---|---|---|---|---|
| 5,115,997 | A | * | 5/1992 | Peterson .................. B64B 1/50 244/25 |
| 5,176,341 | A | * | 1/1993 | Ishikawa .................. B64F 1/14 24/136 R |
| 5,322,219 | A | * | 6/1994 | Esplin ...................... B64D 1/16 239/171 |
| 7,191,694 | B1 | | 3/2007 | Gonzalez |
| 8,070,096 | B2 | * | 12/2011 | Wood ........................ B64F 1/14 244/110 E |
| 2003/0190439 | A1 | | 10/2003 | Gonzalez |
| 2006/0197308 | A1 | * | 9/2006 | Shmueli .................... B64F 3/00 280/400 |
| 2011/0116905 | A1 | | 5/2011 | Von Kessel et al. |
| 2012/0181380 | A1 | * | 7/2012 | Van Staagen ............. B64B 1/50 244/33 |

\* cited by examiner

SELF TRANSPORTABLE AEROSTAT SYSTEM

CLAIM OF PRIORITY

This application claims priority on U.S. Provisional Patent Application Ser. No. 61/583,958 filed Jan. 6, 2012.

FIELD OF THE INVENTION

This invention is directed to a self transportable aerostat system and more specifically, a mobile aerostat system having a large aerostat transported by one or more trucks having relatively small footprints wherein the truck or trucks transport the aerostat, providing a mooring system for a deployed aerostat and provide ground support for the aerostat and payload carried by the aerostat (e.g., surveillance equipment).

BACKGROUND OF THE INVENTION

The use of "lighter than air" balloons for military operations can be traced to the 1800s. Generally, these early balloons were used for: aerial bombing of military targets; aerial reconnaissance by captive (tethered) balloons; and communications. Both the Union and Confederate armies used balloons for reconnaissance during the American Civil War, marking the first time that balloons were used in the United States for reconnaissance.

Today, the Drug Enforcement Administration in the United States operates a series of radar-equipped tethered balloons wherein referred to as aerostats to detect low-flying aircraft attempting to enter the United States across the southern border. A plurality of aerostats are positioned approximately 350 miles apart, from California to Florida to Puerto Rico, to provide radar coverage along the entire southern border.

During the 1990 invasion of Kuwait, the first indication of the Iraqi ground advance was from a radar-equipped aerostat that detected Iraqi armor and air assets moving south. Later, surveillance aerostats were used in the 2004 American occupation of Iraq. These aerostats had an optics system as payloads to detect and observe enemies from miles away. Aerostats are advantageous since suspending surveillance payloads from a generally stabile platform allows for data to be collected over a wide geographic area.

It should be understood that in remote areas such as the battlefields of Iraq and Afghanistan, mobility of equipment faces unique logistical challenges. Environmental factors, distances and circumstances surrounding operations in a foreign country create these unique challenges. For example, forward bases of NATO forces in Afghanistan require constant supplies including gasoline, ammunition, repair parts, and other consumables. Forward bases can be in mountainous areas, traditionally Taliban strongholds, where most airfields are unsuitable for heavy aircraft and supply has to be by palletized, parachute drops.

Additionally, the battlefield mandates that vehicles maintain a balance of armor to protect occupants while also being more fuel efficient to reduce the amount of fuel that needs to be resupplied. Attempts to improve armor include that described in U.S. Pat. No. 7,191,694 which can be used for tactical trucks. Transparent armor is also advantageous for such trucks as described in United States Patent Application Publication 2003/0190439. Not only are these trucks armored, but the terrain in which they operate require that the truck itself be rugged to perform in tough, uneven, unfriendly environments.

The use of aerostats is not limited to stationary mooring systems and aerostats can be deployed from mobile platforms. For example, U.S. Pat. No. 4,402,479 described a tethered aerostat attached to a trailer truck. The trailer truck is a flatbed trailer truck that also carries the electrical generator, helium, fuel supply, and shelter. The trailer truck also carries a tower and a boom fastened to the truck flathead adjacent to the tower. U.S. Pat. No. 4,842,221 also shows a ground based mooring system which uses a flatbed trailer. U.S. Pat. No. 4,421,286 also discloses a mooring system that can be on a mobile installation. Specifically, these references show a flatbed trailer that is hauled by a tractor trailer cab. U.S. Pat. No. 4,476,576 discloses a communications system using an aerostat moored to such a trailer. None of these references are particularly well suited for mobile mooring systems for aerostats as these references are not easily armored, are large in size creating disadvantages when traversing rugged terrain, not fuel efficient and generally difficult to transport to remote locations such as battlefields in foreign countries.

Another use of aerostats is shown in United States Patent Application Publication 2011/0116905, Method And Apparatus for Transporting Elongated, Cumbersome Loads. This application discloses a method for transporting elongated, bulky loads with a cable-guided lifting body having a carrying cable with a balloon node and a crane node. A plurality of mobile controllable winches include winch cables fastened in the lower region of the load suspension unit. Crane winch cables are raised to the crane node and secured in a remote-controlled manner via hoisting cables. While mobile, this application has little to no utility based upon its structure and function for providing a self transportable aerostat system capable of including surveillance or communications requirement in its payload for deployment in areas such as the battle field.

Accordingly, an object of the present invention is to provide a self transportable aerostat system that can be deployed from a mobile ground mooring system.

It is another object to provide a rugged mobile system to handle harsh terrain and operation environments as opposed to flatbed trailer based ground mooring systems not suitable for these in field conditions.

SUMMARY OF THE INVENTION

The above objectives are accomplished according to the present invention by providing a self transportable aerostat system comprising: a mooring truck having a base assembly, tower, boom, outriggers, spreader beams, wheel assemblies and a tether; an aerostat attached to the tether having a payload; a secondary mooring truck in electronic communications with the mooring truck for providing power to the mooring truck and the aerostat; an aerostat truck for aerostat and support equipment in electronic communications with the payload for receiving data from the payload and displaying data according to the received data to a user through a display and, whereby a mobile, remotely deployable aerostat system is provided.

The invention can include a first motorized mooring truck having a base assembly rotatably attached to a bed of the first mooring truck; a mooring tower removable attached to the base assembly generally vertically arranged in relation to the bed of the first mooring truck; a proximal boom deck removably attached to the base assembly of the first mooring truck for supporting an individual; a distal boom deck pivotally attached to the proximal boom deck having a flying sheave for supporting an individual; an outer edge of the distal boom carrying a flying sheave for redirecting a tether carried by the base assembly and attachable to an aerostat; a second motorized mooring truck attachable to the outer edge of the distal boom including a storage area for storing the mooring tower, the proximal boom deck and the distal boom deck when the mooring tower and the proximal boom deck and the distal boom deck are disconnected from the first mooring truck; and, an aerostat truck having an electrical connection for connecting to the first mooring truck and having an aerostat storage compartment for storing the aerostat in a retracted configuration.

Railings can be attached to the proximal boom deck when the system is in an operational position and received in the storage area of the second motorized mooring truck when the system is in a retracted position. A spreader bar attached to the distal boom deck; and, a wheel assembly attached to the distal boom deck for supporting the distal boom deck above the ground and allowing the distal boom deck to rotate about the first motorized mooring truck.

A close haul winch can be attached at a distal end of the spreader bar for retracting a line attached to the aerostat. A plurality of outrigger attachment points can be included on the first motorized mooring truck; and, a plurality of outriggers attached to the outrigger attachment points in an operational position and stored on the first motorized mooring truck in a storage position.

The aerostat truck can include an aerostat storage compartment attached to the aerostat truck for receiving a deflated aerostat; a removable lid to the aerostat storage compartment allowing an individual to stand in the aerostat storage compartment thereby supporting the individual high enough to access a payload attached the aerostat when standing in the aerostat storage compartment and while the aerostat truck is positioned under the aerostat.

A level wind can be carried under the proximal boom deck for directing a main tether from the base assembly to the flying sheave. The mooring tower can include a lower section removable attached to an upper section so that the lower and upper section can be stored on the second motorized mooring truck when detached from each other.

A nose latch can be included in the mooring tower for attaching the aerostat to the mooring tower in a retracted position. A weapon mount can be included on the second mooring truck for supporting a weapon system.

The invention can include a method of deploying an aerostat comprising the steps of: removing an upper and lower mooring tower from a secondary motorized mooring truck; connecting the upper and lower mooring tower to a base assembly attached to a first motorized mooring truck; attached to a proximal boom deck to the first motorized mooring truck; attaching a distal boom deck to the proximal boom deck; connecting a nose line carried by the mooring tower to a nose attachment point of an aerostat stored in an aerostat storage compartment included on an aerostat motorized truck; retrieving the aerostat from an aerostat storage compartment carried by the aerostat truck using the nose line; attaching a tether connected to a tether winch included on the base assembly to the aerostat; and, inflating the aerostat with lighter than air gas.

Bumpers can be attached to the distal boom deck to support the aerostat while the aerostat is being inflated. The second motorized mooring truck can be attached to an outer edge of the distal boom deck to the secondary motorized mooring truck. The invention can include retrieving a spreader beam from the secondary motorized mooring truck; attaching the spreader beam to the to the distal boom deck; and, attaching a wheel to the spreader beam so that the distal boom deck may rotate about the mooring tower. The outer edge of the distal boom deck can be attached to the second motorized mooring truck. A payload can be attached to the aerostat. A lid can be removed from the aerostat storage compartment so that an individual can access the aerostat to attach the payload.

DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein:

FIG. 1A is a schematic of the invention.

DESCRIPTION OF A PREFERRED EMBODIMENT

Figure 1B:
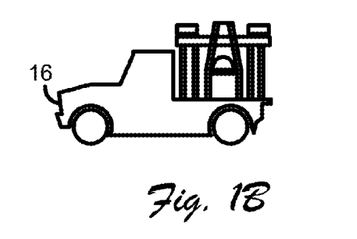
FIGS. 1B through 1D are side views of aspects of the invention.

Referring to the drawings, the invention will now be described in more detail. FIG. 1 shows an aerostat 10 having a payload bay 12 for carrying a payload and forward attachment point 14. The aerostat is filled with lighter than air (LTA) gas so that it is buoyant. In one embodiment, the aerostat is a 28M system or larger manufactured by the applicant and can have the following specifications: it can lift 900 lbs of payload weight to 3,000 feet above ground level (AGL) from a 3,000 foot pad, it can lift 700 lbs of payload weight to 3,000 AGL from a 6,000 foot pad, include a 5 kWatt power supply for payloads, include 5 optical fibers for payloads, can fly for up to 4 weeks, has a minimum mooring pad radius of 110 ft and a hull volume of 55,300 ft$^3$. Among other things, payloads can include 2 cameras (MX-15 or FLIR 380HD) and Vista Radar.

The aerostat can be tethered to a first motorized mooring truck 16. Examples of mooring trucks include the Oshkosh M-ATV (Standard), Oshkosh M-ATV Ambulance, International MaxxPro Dash (Standard) and the International MRV (MRAP Recovery Vehicle). It should be noted that the mooring truck need not be armored. In one embodiment, the mooring truck includes a 8 foot by 8 foot bed 18 with a height of approximately 13 feet 6 inches.

Figure 2:
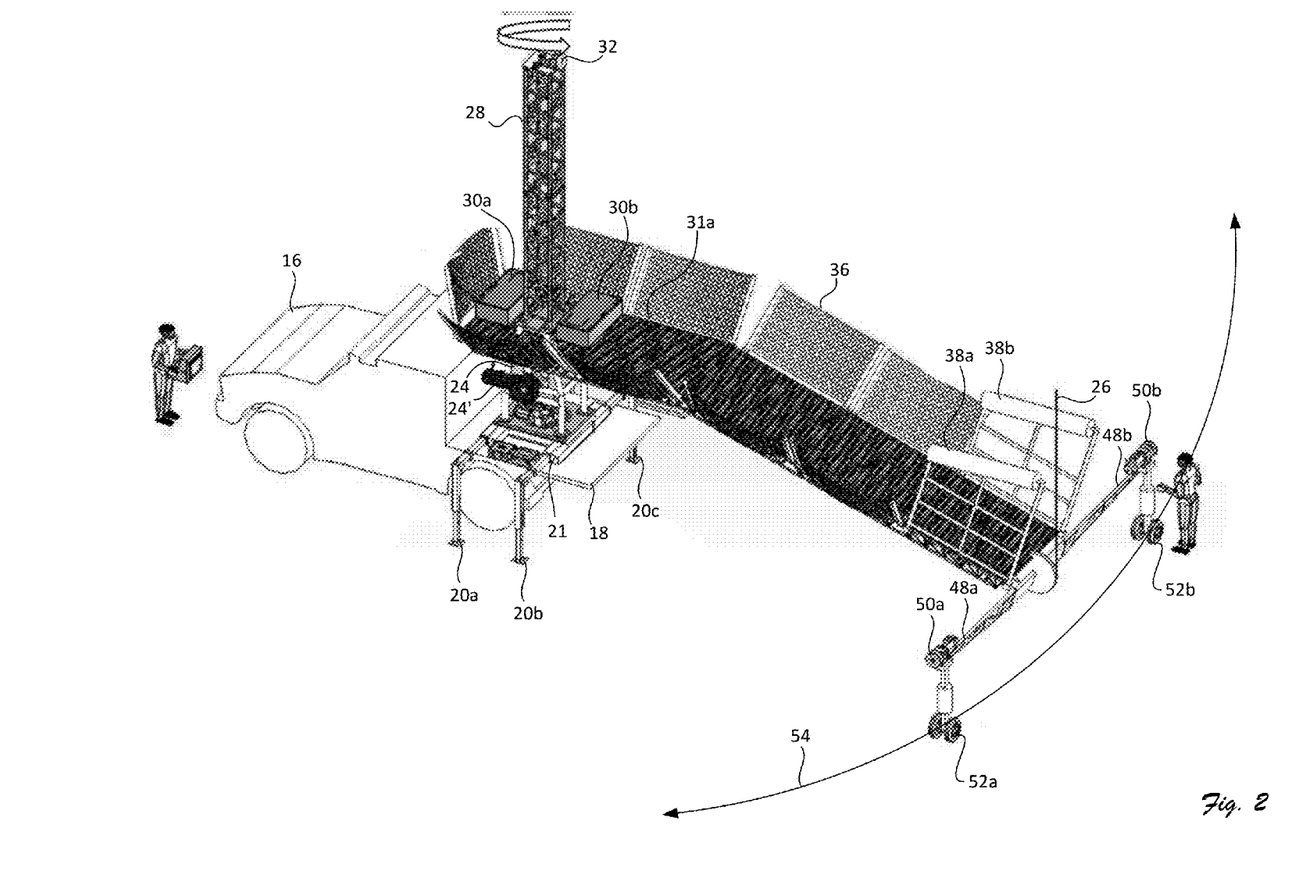
FIG. 2 is a perspective view of aspects of the invention.

Referring to FIG. 2, the first motorized mooring truck is described in more detail. A outrigger attachment point 21 is included in the base assembly 22 of the first motorized mooring truck. Outriggers 20a through 20c (fourth outrigger on opposite side not shown) can be attached to the bed using the outrigger attachment points or otherwise can be carried by the truck. The outriggers can be located on both sides of the truck when deployed. The base assembly 22 is carried by the truck and can be attached to truck bed 18. A tether winch 24 can be carried by the truck and attached to the base assembly and can be operatively associated with a tether for deploying and retracting the aerostat. Tether 26 can be attached to the aerostat and extended from and retracted into the base assembly.

Figure 3A:
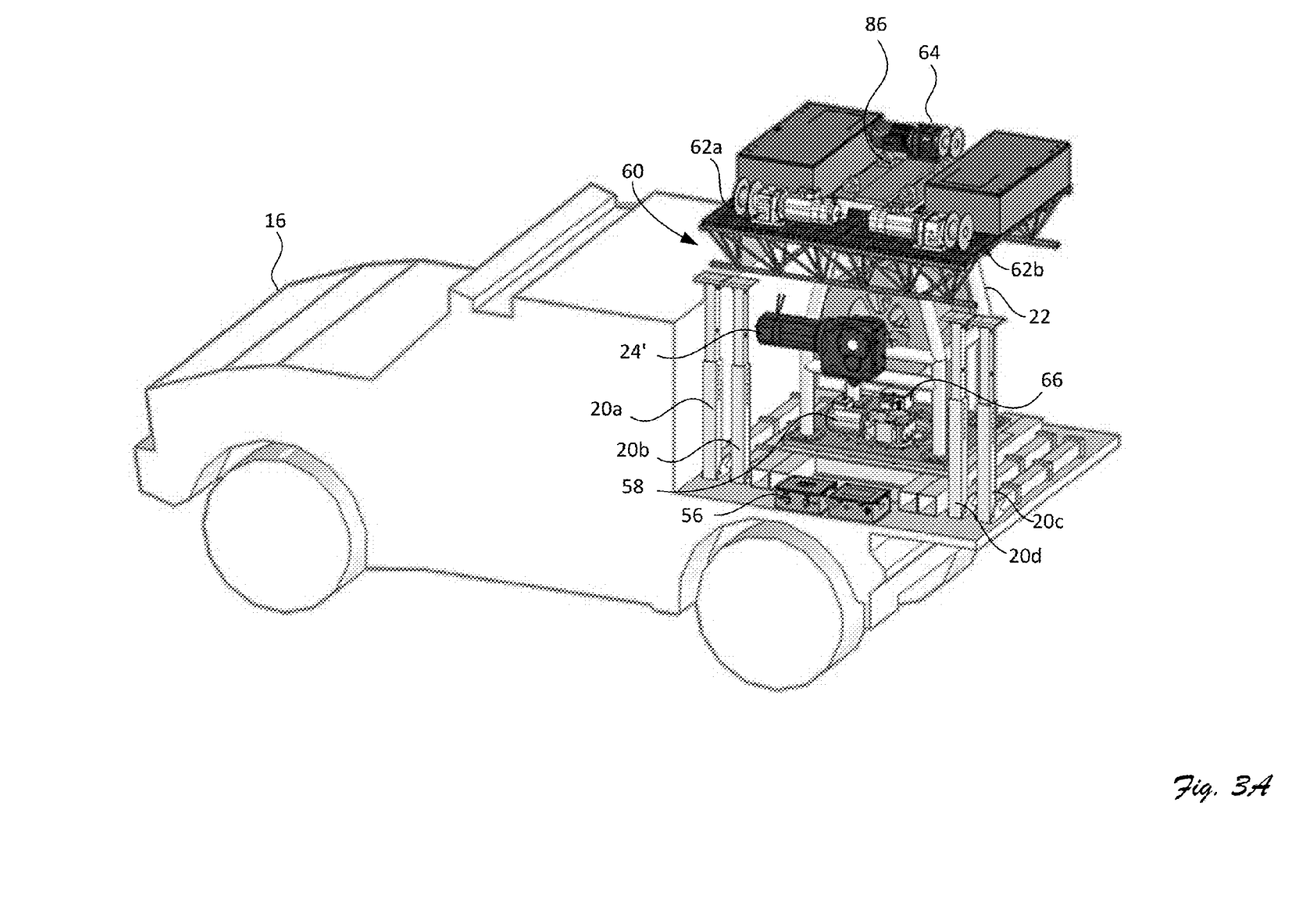
FIGS. 3A and 3B are perspective views of aspects of the invention.

Referring to FIG. 3A, a mooring tower 28 is removably attached to the base assembly when in the operational position and disposed generally vertically to the ground. In one embodiment, the tower 28 can include an upper and lower section that can be connected and can each be eight feet in length and made from carbon fiber. The tower and its sections can be stored on a second motorized mooring truck 68. Each tower section could weigh less than 50 pounds resulting in lightweight, stackable tower sections.

Figure 3B:
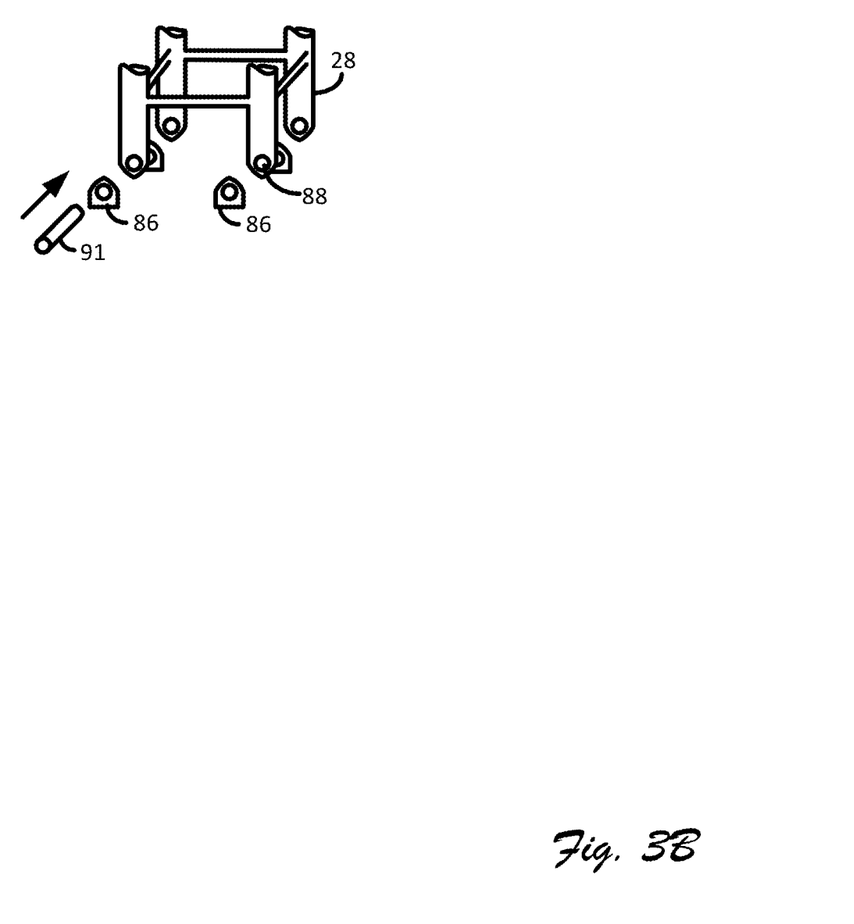

The tower and tower sections can be square, rectangular or triangular in cross-section. The sections can be an assembly of vertical supports connected by a plurality of cross members. Referring to FIG. 3B, the rower can be attached to the mooring truck through a plurality of base assembly eyelets 86 that can engage tower eyelets 88 and be secured through a plurality of pins such as shown as 91. In one embodiment, the boom comprises five truss sections made from carbon fiber and are 30 pounds in weight each. Stays can be used to further secure the tower to the truck.

Referring to FIG. 3A, electrical boxes or other utility boxes 30a and 30b can be carried by the truck and can be used to route power to the various components such as the winch motor, base assembly and the like. A nose latch 32 can be carried by the distal end of tower 28 to secure the aerostat to the tower in the retracted position, or to assist with lowering and deploying the aerostat.

In one embodiment, a boom 34 can be attached to the base assembly and can comprise multiple boom sections allowing the boom to be dissembled and stored in a dissembled configuration having a smaller footprint than a fully extended boom. The boom sections can be stored on the secondary motorized mooring truck. In one embodiment, a proximal boom deck 31a is attached to the base assembly of the first motorized mooring truck. The proximal boom deck can provide a support surface for an individual to access the aerostat. When stored, the proximal boom deck is stored on the secondary motorized mooring truck. A distal boom deck 31b can be hingeably attached to the proximal boom deck. A plurality of mid boom deck sections can be attached to each other and be disposed between the proximal and distal boom decks.

The boom section or decks can have a square, rectangular or triangular cross-section and can include support members connected by cross-members. The boom sections can be pivotally attached to each other with damped hinged joints to accommodate terrain changes if the boom rotates about an axis generally in line with the tower vertical axis. While moored, shown as 46, the aerostat can weather-vane so that the nose 42 (FIG. 1) is pointed into the wind with fins 44a through 44c trailing the nose.

Spreader beams 48a and 48b can be attached to an outer edge of the distal boom deck and can carry distal close haul winches 50a and 50b, respectively, for further securing the aerostat in a lowered or retracted position. Wheel assemblies 52a and 52b that are vertically compliant for uneven terrain can be carried by the spreader beams allowing the boom to rotate in a circular direction 54 around the truck.

Multiple railing sections such as 36 can be attached to the boom decks providing additional safety to help prevent individuals and items from falling off the boom. Bumper rails 38a and 38b can be attached to the distal boom deck for moored restraint of the aerostat. Flying sheave 40 can be carried by the distal boom deck to redirect the tether 26 upwards toward the aerostat. Support wheels 52a and 52b allow the boom to travel in circular path 54 generally around the truck, which in turn allows the aerostat to weather-vane when connected to the tower.

Referring to FIG. 3A, the first motorized mooring truck 16 is shown in more detail in its stowed/retracted arrangement. A set of lower utility boxes 56 are carried by base assembly 22 and can include electrical junctions for power, fiber optic interfaces, data interfaces, and the like. Rotational winch 58 can be attached to the base assembly or otherwise carried by the truck for rotating an upper base assembly 60 of the base assembly and thereby rotating the tower. Tether winch motor 24' is shown operatively associated with tether winch 24 for deploying and retracting the tether. Close haul winches 50a and 50b can be attached to the upper base assembly at locations 62a and 62b respectively in transportation mode. A nose winch 64 can be attached to the upper base assembly for further securing the aerostat to the tower. Electrical connectors and fiber optic connectors 66 can be housed in a slip ring. A fiber optic rotary joint can be included in the upper base assembly for connecting payload equipment on the aerostat to the ground support systems. The outriggers are shown in a stowed configuration and carried by the base assembly.

Figure 1C:
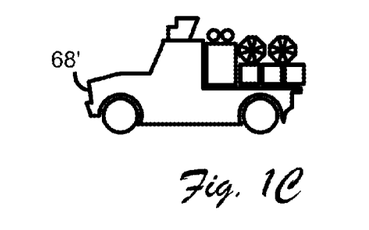
Figure 1D:
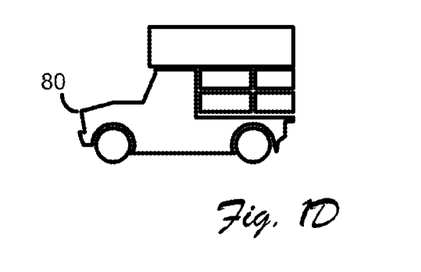

Referring to FIG. 1C, a second motorized mooring truck 68' is shown in the stowed arrangement and as 68 (FIG. 1A) in the operational arrangement. In the operational arrangement, a generator 70 is carried by the second motorized mooring truck and in electrical communication with first motorized mooring truck to supply power to the base assembly, its various components, aerostat and payload(s). The second motorized mooring truck can include a fuel reservoir for providing fuel to the generator. A weapons mount 72 can be included on the second motorized mooring truck 68 to provide protection for the transportation convoy.

Figure 4:
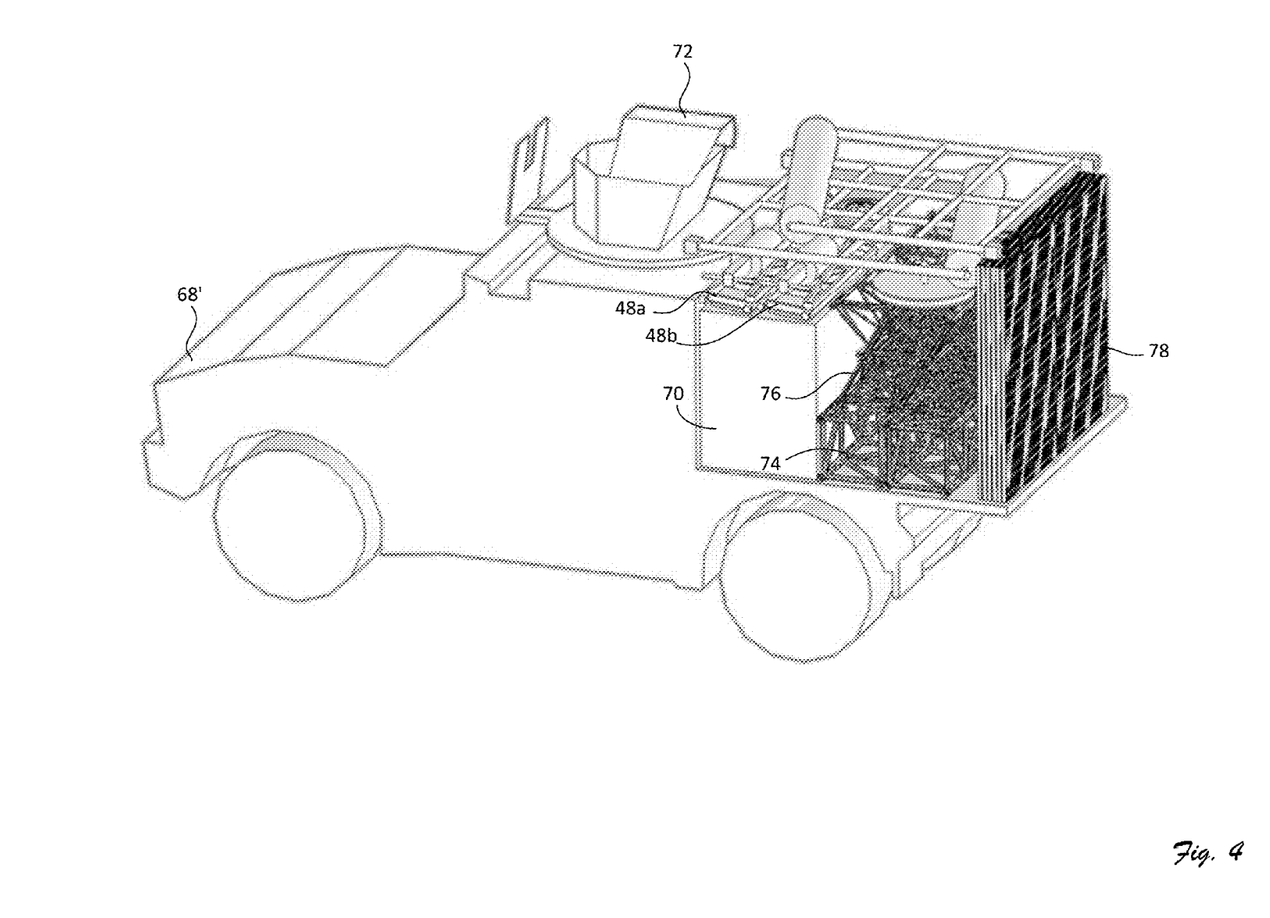
FIG. 4 is a perspective view of aspects of the invention.

FIG. 4 shows secondary truck in its stowed arrangement. In this arrangement, the proximal and distal boom decks, mid boom decks, tower sections, deck rails, and bumpers rails are stored on the bed of the second motorized mooring truck. Spreader beams 48a and 48b are shown stored above generator 70 and have wheel assemblies attached. Flying sheave 40 is stored above the tower sections with bumper rails stored above the pulley. The various boom decks 78 are stored on the bed of the secondary truck adjacent to the tower sections 74 and 76 with the railing sections 36 (not shown) and bumper rails 38a and 38b arranged above the tower sections. In one embodiment, railing sections comprised of support structures and netting.

Figure 5A:
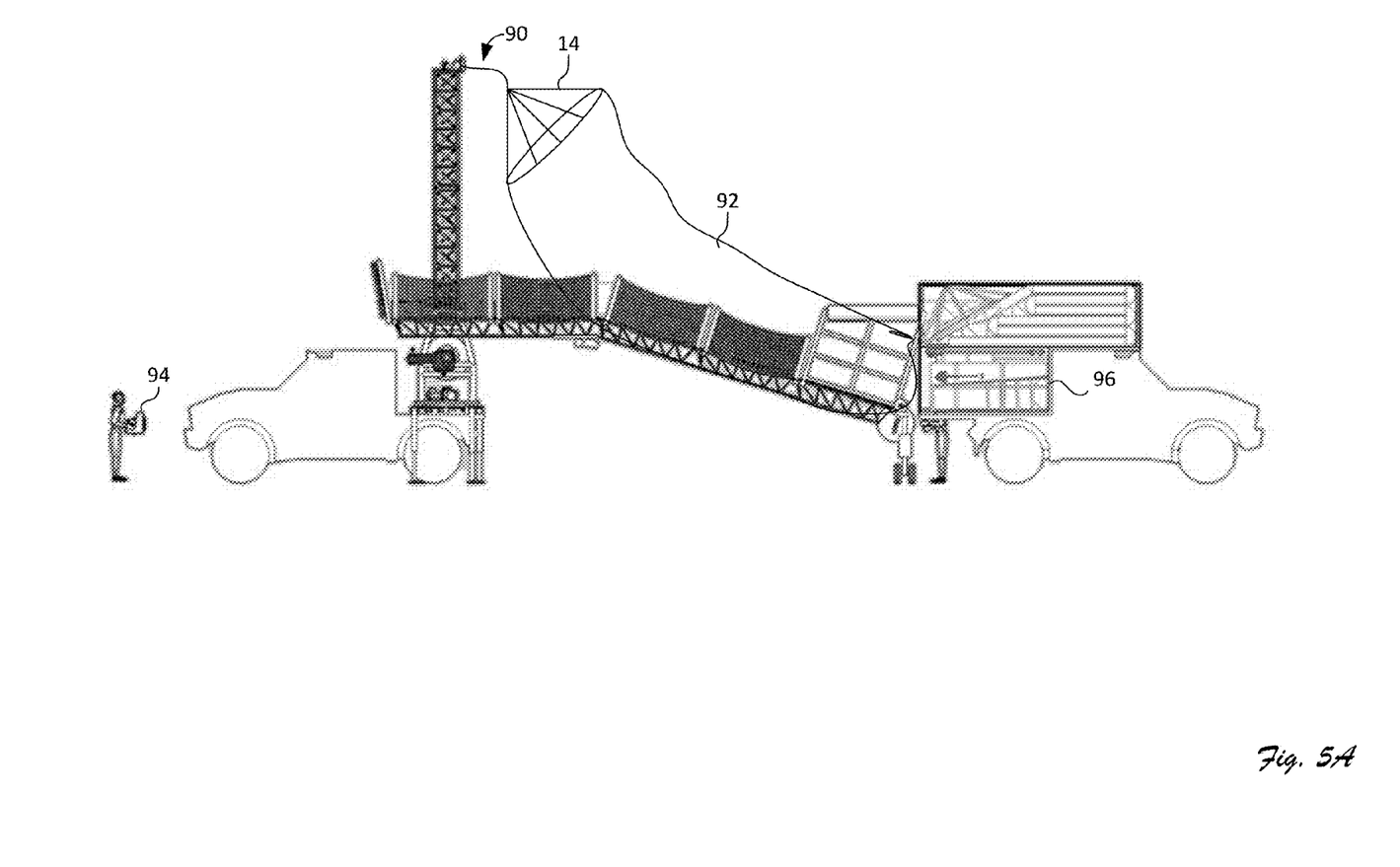
FIGS. 5A and 5B are elevation and perspective views of aspects of the invention.
Figure 5B:
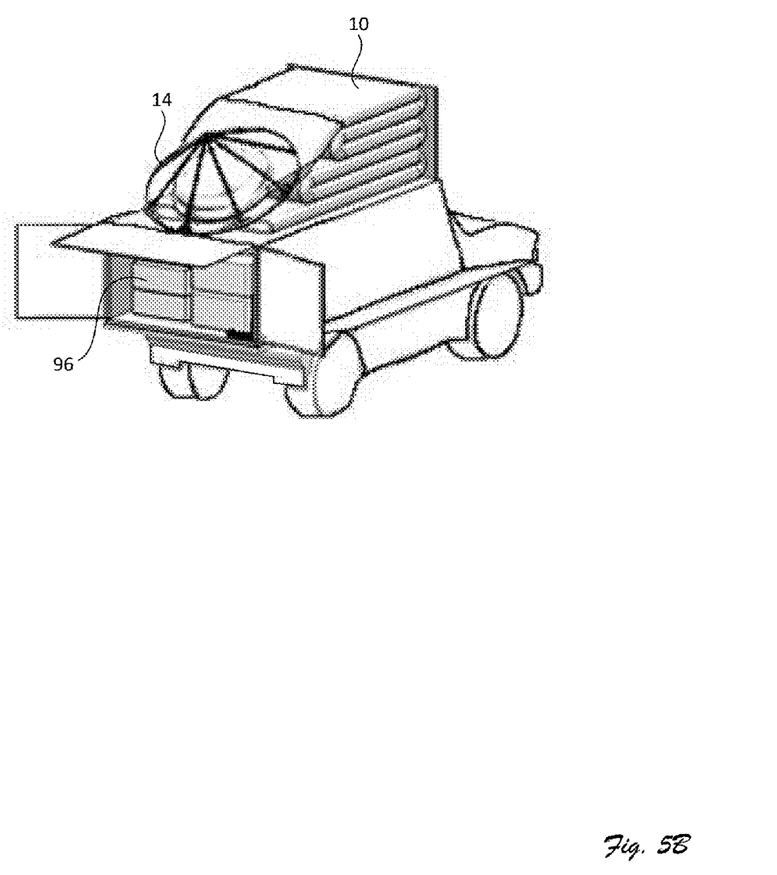
Figure 9:
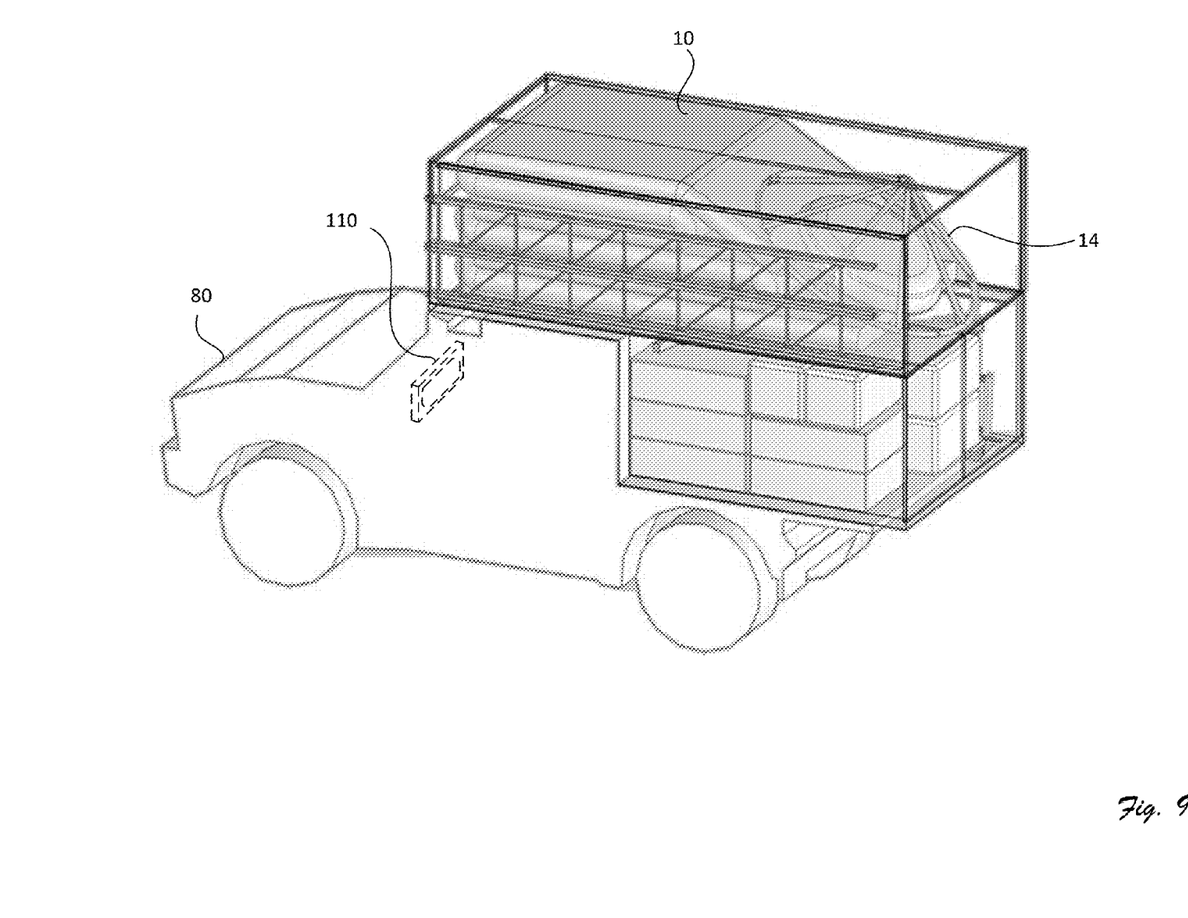
Figure 14:
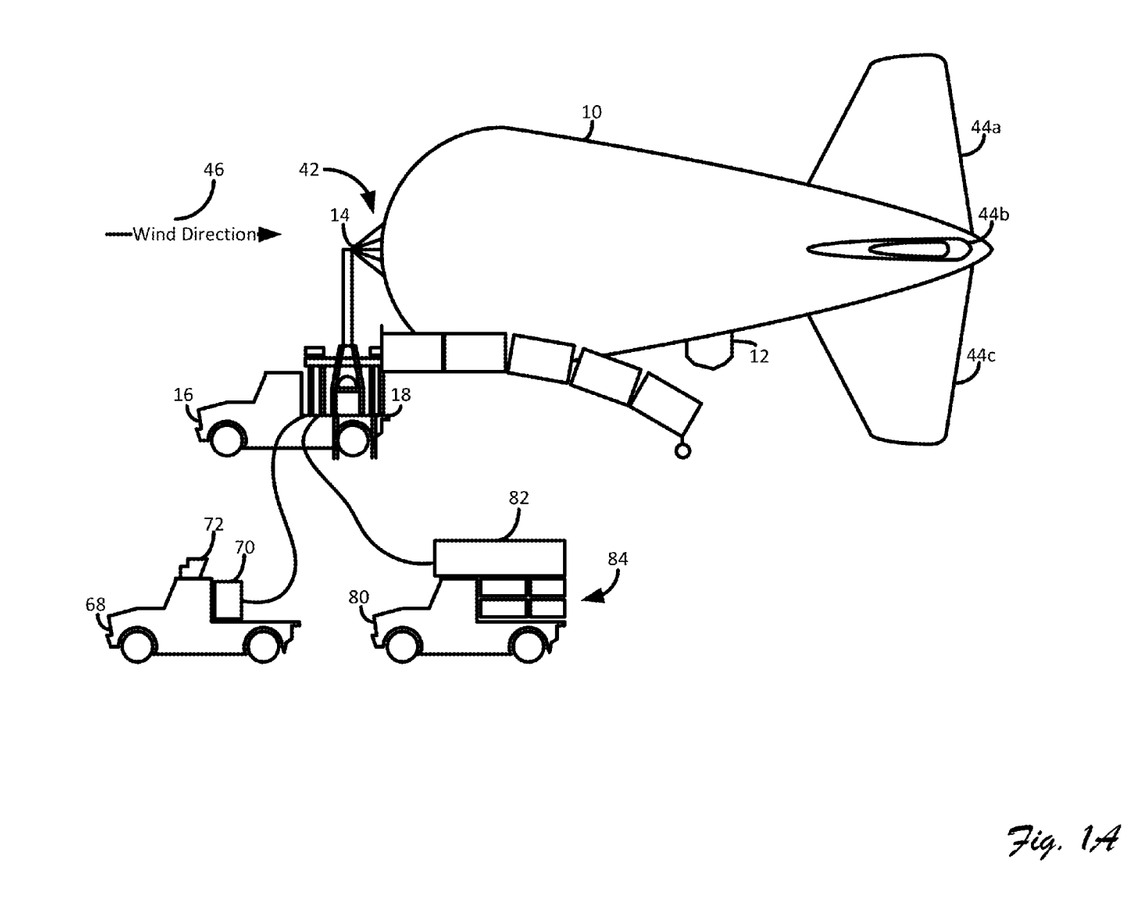

Aerostat truck 80 (FIGS. 1A, 1D and 5B) includes an aerostat storage compartment 82 and various support equipment 84 for the aerostat itself. The aerostat truck can be in electrical communications with the first motorized mooring truck so that payload, telemetry, optical, and other data can be transmitted between the aerostat truck, the first motorized mooring truck, and the various equipment or payload on the aerostat itself. A display 110 (FIG. 9) associated with the payload (e.g., sensors, cameras, and the like) can be placed inside the aerostat truck so that information from the aerostat can be viewed by users in the aerostat truck.

It should be noted that the particular arrangement described need not be identical as the various components of the inventions can be stored on the various trucks in any number of possible combinations. The components of the invention can also be delivered to an operational site through airlift. A trailer can be included and carried by one of more of the trucks for transporting equipment, helium and the like. Further, one or more trailers can be substituted for one or more of the trucks as described herein so that the mooring truck, secondary mooring truck or aerostat truck can be substituted with a trailer carried by a remaining truck.

When deploying the aerostat 10 (FIG. 5A), the first motorized mooring truck has the tower, boom, spreader beams, and wheel assemblies deployed. The aerostat truck backs up to the outer edge of the distal boom deck. Nose line 91 is deployed from the tower and attached to nose attachment point 14 of the aerostat. The nose line is retracted thereby pulling the aerostat from the aerostat storage compartment 82. Tarps 92 can be placed on the boom and railing sections to prevent the boom and railing sections from catching on the material of the aerostat thereby reducing the chance of damaging the aerostat when it is being deployed. The nose winch operator can operate the nose winch remotely using a wired or wireless controller 94. Storage area 96 can be included in the aerostat truck for storing and transporting utilitarian and maintenance items such as shovels, ladders, avionics, tools, and the like. In one embodiment, the aerostat truck has a 9 foot truck bed, is 13 feet 6 inches in height, 8 feet in width, and an aerostat storage compartment that is 15 feet in length and 8 feet in width with storage compartment 96 and aerostat storage compartment 82 being a combined 8 feet 6 inches in height. The aerostat storage compartment can contain the aerostat, nose attachment point, and the payload racks. In one embodiment, the aerostat is folded in an 'S' configuration for storage.

Figure 6:
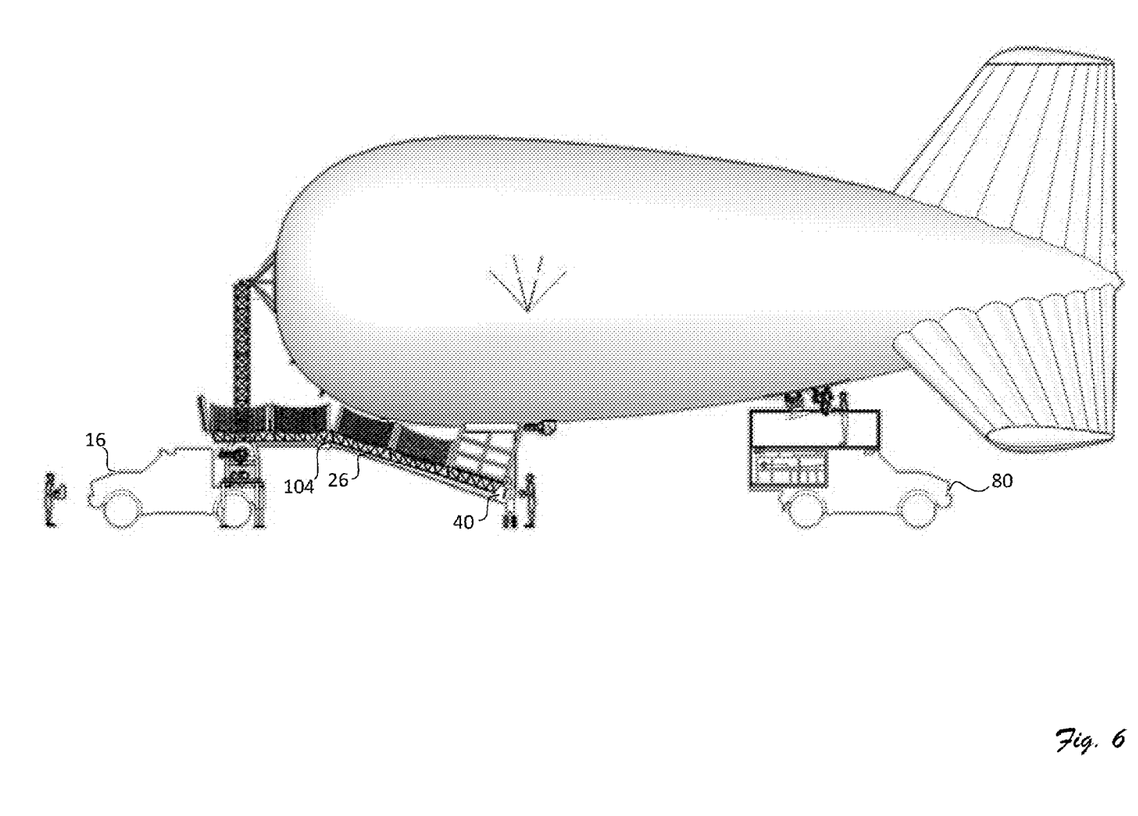
FIG. 6 is an elevation view of aspects of the invention.

In one configuration as shown in FIG. 6, the aerostat truck 80 can also be used to access payloads while the aerostat is inflated. In this configuration, the top or lid of the aerostat storage container can be removed providing access to the interior of the aerostat compartment and allowing an individual to stand in the compartment area. The individual it thereby raised a sufficient height above the ground to reach the payload areas of the aerostat. In another embodiment, the aerostat storage compartment does not have a top. In one embodiment, the aerostat storage container's floor is 9 feet AGL and the top of the aerostat storage container is 13 feet 6 inches AGL. Safety rails can be included with or attached to the aerostat storage compartment in the event that the storage compartment does not include a top or sides. In one embodiment, the sides of the aerostat storage compartment rotate downwards to assist with the deployment of the aerostat. The payload rack and payload can be accessed by the individual standing in the aerostat storage compartment. In one embodiment, there are two 14 foot payload racks.

Figure 7:
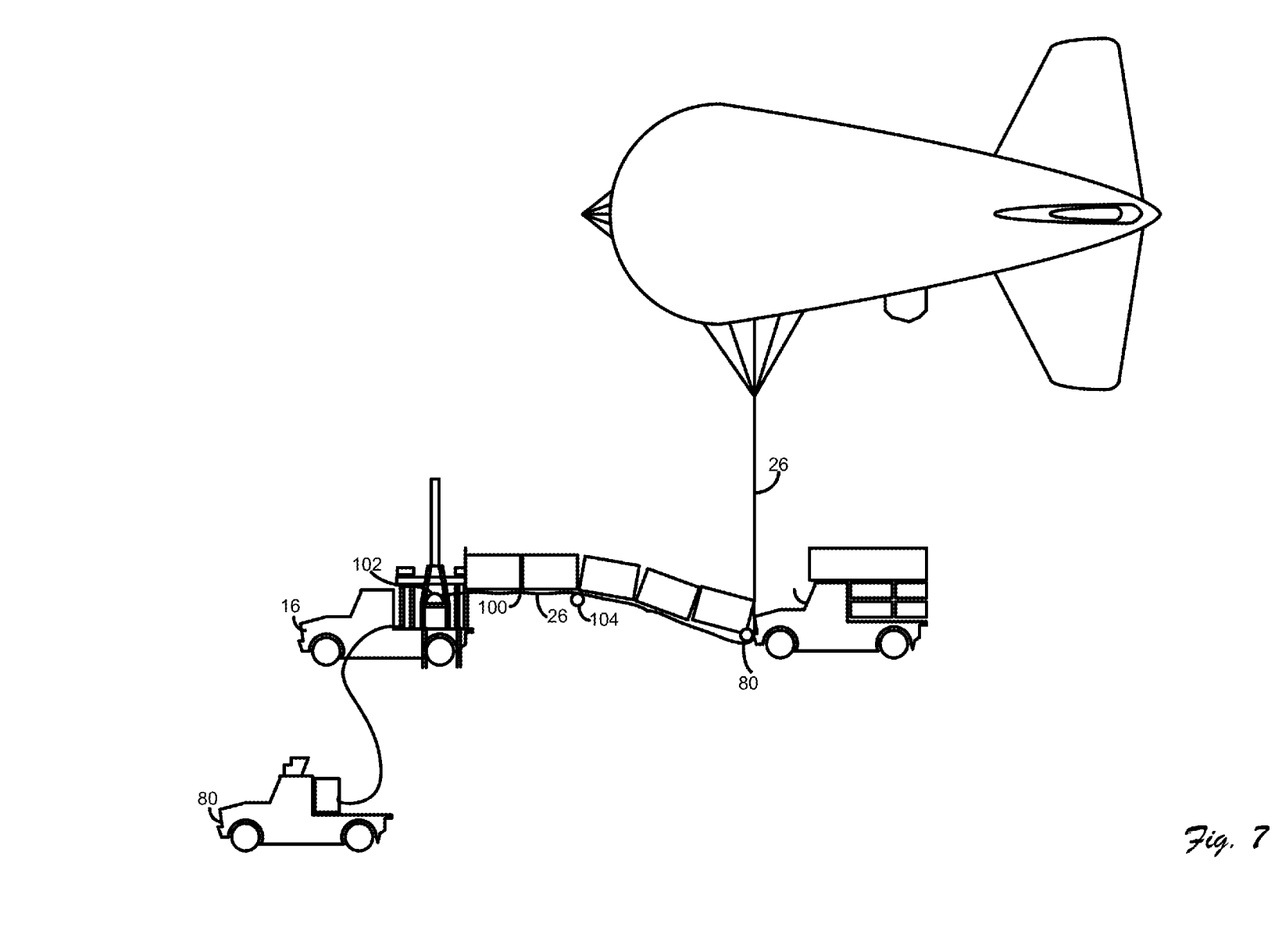
FIG. 7 is a schematic of the invention; and,
FIGS. 8A, 8B, and 9 are perspective views of components of the invention.
Figure 8A:
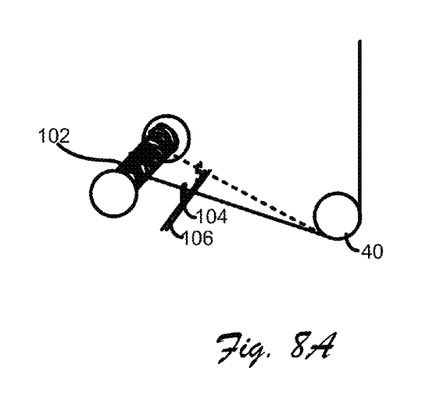
Figure 8B:
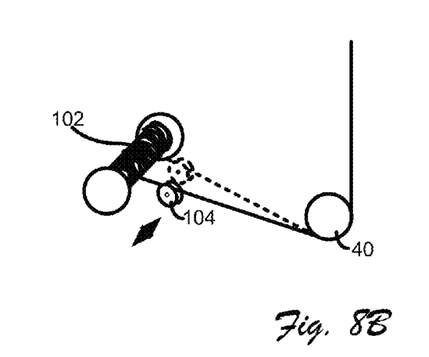

Referring to FIG. 7, one embodiment of the invention is shown. An outer edge of the distal boom deck can be attached to the aerostat truck to provide reaction force for the boom and reduce stresses on the boom from the lift generated by the aerostat. This configuration would be used generally when the aerostat lifts to an altitude of 250 AGL and the mooring system is no longer required to weather-vane.

Each of the deck sections can be pivotally attached to each other through hinges such as shown as 100. These hinges can be dampened to allow for the boom to travel across and lie upon uneven ground and terrain.

Tether 26 is carried by tether spool 102 and can run along the underside of the boom sections. When the tether is being retracted, a level wind 104 can be included to allow the tether be generally evenly distributed around the tether spool. In one embodiment, the level wind is comprised from components taken from the group of sheave, pulley, fairlead, bellmouth and can have a smooth and/or large radius for guiding the tether. In one embodiment, the level wind and flying sheave have approximately the same radius. In one embodiment, level wind 104 is a generally vertical member having an opening for receiving the tether and carried by a track 106 allowing the level wind to travel back and forth in a direction parallel to the axis of the tether spool. The tether then is redirected generally upwards by flying sheave 40.

In one embodiment, a 28M aerostat is used with 56,000 ft$^3$ of Helium needed. Helium tanks can be made from material taken from the group of aluminum, steel, carbon fiber, composites, or any combination of these. Generally, the size of the tanks would be eight feet by eight feet by ten feet. Therefore, these tanks could be carried by one of the aforementioned trucks, a trailer attached to one of the trucks or a fourth truck.

From the above-described configuration and the advantage achieved from this structure, six to eight individuals would be all that is necessary to deploy to the aerostat. Operation of the aerostat would only require 2 to 3 individuals. In operations, the various motorized vehicles can arrive at a remote location and are able to reach generally areas inaccessible by vehicles with trailer and cap configurations. The tower is removed from the second motorized mooring truck and attached, generally vertically, to the base assembly. The proximal boom deck is attached to the base assembly and the distal boom deck is attached. The nose line is connected to the aerostat nose attachment point and when the nose line is retracted using the nose winch, the aerostat is retrieved from the storage compartment of the second motorized mooring truck. The tether is attached to the aerostat and disposed under the proximal and distal boom decks. The aerostat is inflated.

The lid of the storage compartment of the aerostat truck can be removed and an individual can stand on the aerostat truck to reach the payload area of the aerostat to install, remove or otherwise maintain the payload. In one embodiment, the outer edge of the distal boom deck can be attached to the second motorized mooring truck. In this configuration, the aerostat and mooring trucks can withstand higher winds and can withstand winds in excess of 30 knots.

In one embodiment, the proximal boom deck and distal boom deck can are arranged in a cantilevered arrangement and can withstand winds up to 30 knots. A 28M (56,000 ft$^3$) or larger aerostat can be configured to fit into two MRAP trucks with volume less than 608 cu. ft. and bed foot print less than or equal to 8'×8' area. The aerostat can be deployed in two hours or less.

While a preferred embodiment of the invention has been described using specific terms, such description is for illustrative purposes only, and it is to be understood that changes and variations may be made without departing from the spirit or scope of the following claims.

What is claimed is:

1. A self-transportable aerostat system comprising:
   a first motorized mooring truck;
   a base assembly rotatably attached to a bed of said first mooring truck;
   a mooring tower removably attached to said base assembly and disposed generally vertical in relation to the bed of said first mooring truck;
   an aerostat removably attached to said mooring tower;
   a proximal boom deck removably attached to said base assembly of said first mooring truck configured to support a person;
   a distal boom deck pivotally attached to said proximal boom deck;
   a flying sheave carried by said distal boom deck, wherein said distal boom deck is configured to support a person;
   a tether carried by said base assembly and removably attached to said aerostat;
   wherein an outer edge of said distal boom is attached to said flying sheave, wherein the flying sheave is configured to redirect said tether;
   a second motorized mooring truck attachable to said outer edge of said distal boom;
   a storage area included on said second motorized mooring truck configured to store said mooring tower, said proximal boom deck and said distal boom deck when said mooring tower and said proximal boom deck and said distal boom deck are disconnected from said first mooring truck; and, an aerostat truck having an electrical connection configured to transmit data between said aerostat truck and said first mooring truck; and, an aerostat storage compartment included with said aerostat truck configured to store said aerostat in a retracted configuration.

2. The system of claim 1 including railings attached to said proximal boom deck when said system is in an operational position and received in said storage area of said second motorized mooring truck when said system is in a retracted position.

3. The system of claim 1 including:
a spreader bar attached to said distal boom deck; and,
a wheel assembly attached to said distal boom deck configured to support said distal boom deck above the ground and allow said distal boom deck to rotate about said first motorized mooring truck.

4. The system of claim 3 including close haul winches attached at a distal end of said spreader bar for retracting a line attached to said aerostat.

5. The system of claim 1 including:
a plurality of outrigger attachment points attached to said first motorized mooring truck; and,
a plurality of outriggers attached to said outrigger attachment points in an operational position and stored on said first motorized mooring truck in a storage position.

6. The system of claim 1 including:
a payload attached the aerostat; and,
a removable lid attached to said aerostat storage compartment configured to allow a person to stand in the aerostat storage compartment thereby supporting the person high enough to access said payload when standing in the aerostat storage compartment and while said aerostat truck is positioned under said aerostat.

7. The system of claim 1 including a level wind carried under said proximal boom deck for directing a main tether from said base assembly to said flying sheave.

8. The system of claim 1 wherein said mooring tower includes:
a lower section; and,
an upper section removably attached to said lower section and configured to allow said lower and upper section to be stored on said second motorized mooring truck when detached from each other.

9. The system of claim 1 including a nose latch attached to said mooring tower to attach said aerostat to said mooring tower in a retracted position.

10. The system of claim 1 including a weapon mount included on said second mooring truck for supporting a weapon system.

11. The system of claim 1 including:
a payload carried by said aerostat;
a display carried by said aerostat truck and in electronic communication with said payload wherein the display is configured to display information transmitted from the payload to the display to be viewed.

12. A self-transportable aerostat system comprising:
an aerostat;
a first motorized mooring truck having a bed;
a base assembly rotatably attached to said bed;
a mooring tower removably attached to said base assembly and disposed generally vertical in relation to the bed of said first mooring truck;
a proximal boom deck removably attached to said base assembly of said first mooring truck configured to support a person;
a distal boom deck pivotally attached to said proximal boom deck and configured to support a person;
a flying sheave attached to said distal boom deck;
a tether winch included in said base assembly;
a tether carried by said tether winch, wherein said tether is disposed under said proximal and said distal boom decks and redirected by said flying sheave;
wherein an outer edge of said distal boom deck is attached to the flying sheave, wherein said flying sheave is configured to redirect said tether carried by said base assembly and said tether is removably attached to the aerostat;
a spreader bar attached to said distal boom deck;
a wheel assembly attached to said distal boom deck configured to support said distal boom deck above the ground and allow said distal boom deck to rotate about said first motorized mooring truck;
a second motorized truck having a generator in electrical communication with said first motorized mooring truck to supply power to the base assembly; and,
an aerostat truck having an electrical connection configured to transmit data between said aerostat truck and said first mooring truck; and,
an aerostat storage compartment included in said aerostat truck for storing said aerostat in a retracted configuration.

13. The system of claim 12 including a mid boom deck carried between said proximal and said distal boom decks.

* * * * *